United States Patent

Morey, Sr.

[15] 3,695,544

[45] Oct. 3, 1972

[54] RETRACTABLE CORD REEL ASSEMBLY

[72] Inventor: William J. Morey, Sr., Elmhurst, Ill. 60126

[73] Assignee: Morey Corporation, Downers Grove, Ill.

[22] Filed: Oct. 5, 1970

[21] Appl. No.: 78,055

[52] U.S. Cl. .................................................242/107 R
[51] Int. Cl. ...................................................B65h 75/48
[58] Field of Search ..................................242/107 R, 107.1, 107.11, 107.13, 242/107.2, 107.3, 107.4, 107.6, 107.7; 191/12, 12.2

[56] References Cited

UNITED STATES PATENTS

| | | |
|---|---|---|
| 1,446,410 | 2/1923 | Bennett et al. ..........242/107.1 |
| 3,409,246 | 11/1968 | DePas........................242/107 |
| 2,438,515 | 3/1948 | Mohler................242/107.1 X |
| 2,518,071 | 8/1950 | Rushworth..............242/107.1 |
| 3,061,234 | 10/1962 | Morey....................242/107.1 |

Primary Examiner—Werner H. Schroeder
Attorney—Wallenstein, Spangenberg, Hattis & Strampel

[57] ABSTRACT

A reel body rotatably supported on a frame and spring-urged into a given reference position includes a main peripheral cord storage compartment having an axial and radial extent each equal to a number of cord thicknesses, a cord take-up compartment positioned alongside said main cord storage compartment and having an axial extent of only about one cord thickness. The main cord storage and cord take-up compartments respectively having hub portions around which different portions of the same cord are wound initially in the same direction, the ub portion of the main cord storage compartment being positioned substantially outwardly of the hub portion of the cord take-up compartment. The cord wound around the hub portion of the main cord storage compartment has an inner winding connected to the first or inner winding on the hub portion of the cord take-up compartment which joins a number of windings which is only a fraction of the number of windings in the main cord storage compartment.

7 Claims, 6 Drawing Figures

PATENTED OCT 3 1972 3,695,544

INVENTOR.
WILLIAM J. MOREY, SR.

BY Wallenstein, Spangenberg, Hattis & Strampel

ATTY

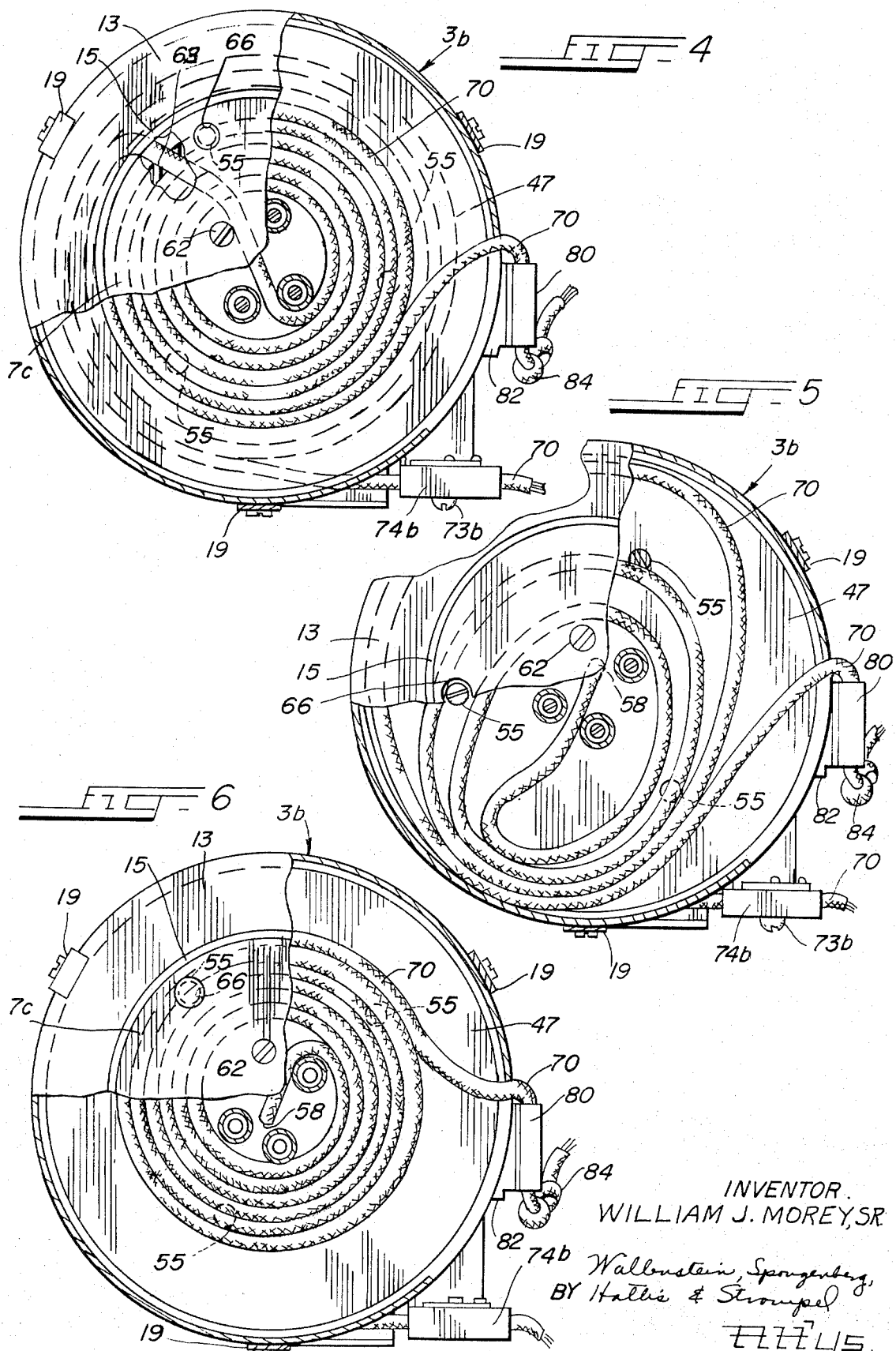

RETRACTABLE CORD REEL ASSEMBLY

This invention relates to a reel assembly for gathering in and paying out cords, most advantageously electric power cords or other conductor cords of portable electrical applicances, machine tools and other electrical devices where it is desired to move the devices around during use.

The present invention relates to an improvement in a type of conductor cord reel assembly which has a single rotatably mounted reel body having at the periphery thereof an annular main cord storage compartment having an axial and radial extent each equal to a number of cord thicknesses. The reel body further has a cord take-up compartment positioned alongside the main cord storage compartment and having an axial extent of about one cord thickness. The radial inner margin of the main storage compartment is defined by a hub positioned radially outwardly a substantial distance from the corresponding radial inner margin of the cored take-up compartment also constituted by a hub. The inner end of the cord involved is generally wound within the cord take-up compartment a number of times approximately equal to one half the number of turns of the cord in the main cord storage compartment and winds in the same direction. The diameter of the hub in the cord take-up compartment being relatively small and having a small number of turns of the cord thereon, only a relatively small length of cord is unusable for unwinding or pay-out. The reel body is spring urged into a given reference position and when the cord is unwound from the main cord storage compartment, the windings of the cord in the cord take-up compartment will unwind or loosen from the hub thereof and expand into the space provided in the take-up cord compartment. When all the cord has initially loosened from the hub of the cord take-up compartment, any further unwinding of the cord from the main cord storage compartment will cause the cord in the cord take-up compartment to wind tightly in the opposite direction around the hub of the take-up compartment. As the reel body rotates with the unwinding of the cord, a coil spring attached to the reel body is tightened so that release of a pull-out force on the cord will result in the automatically rewinding of the cord upon the reel hub.

It is an object of the present invention to provide a cord reel assembly of the type above described which is of a more compact and economical construction than the cord reel assemblies of the type previously developed.

The manner in which the aforesaid objective is achieved can be best understood by referring to the specification to follow and the drawings which illustrate the most preferred form of the present invention.

In the drawings:

FIG. 4 is a plan view, partly broken away, of the cord reel assembly of FIG. 1 when it is in its initial position;

FIG. 5 is a view corresponding to FIG. 4 when approximately one half of the cord has been unwound from the cord reel assembly; and FIG. 6 is a view corresponding to FIG. 4 when the entire cord has been unwound from the cord reel assembly.

Figure 1:
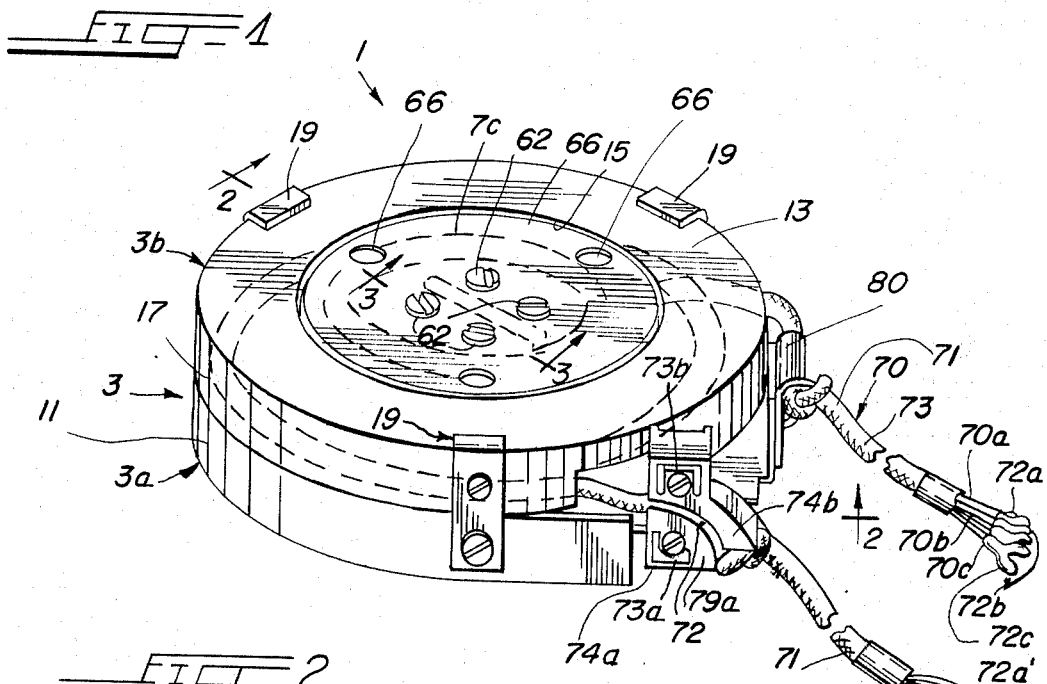
FIG. 1 is a perspective view of a cord reel assembly incorporating the features of the present invention.
Figure 2:
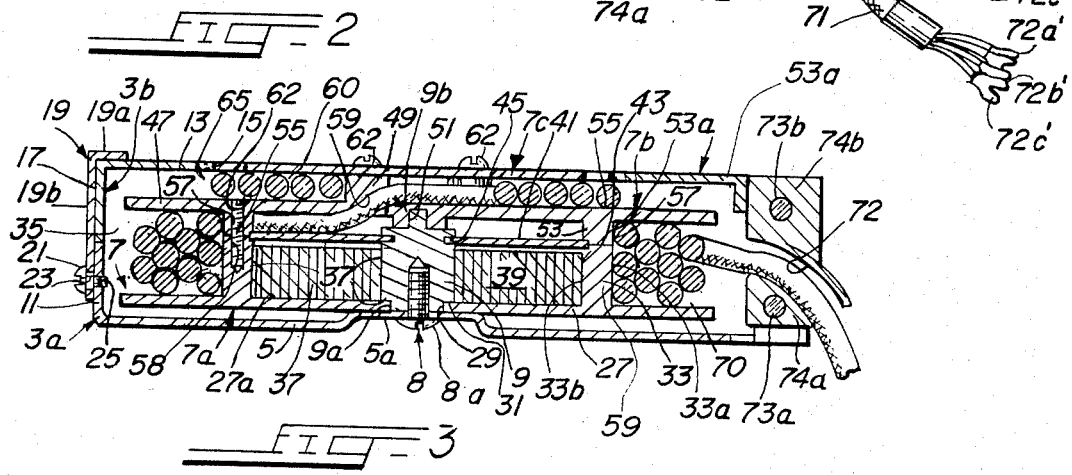
FIG. 2 is a sectional view through the cord reel assembly of FIG. 1, taken along section line 2—2 thereof.
Figure 3:
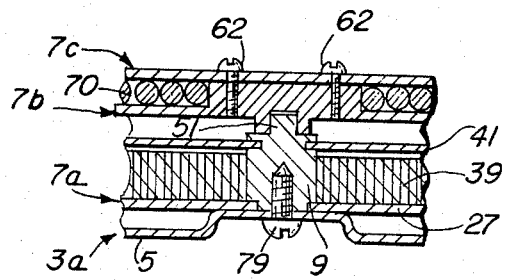
FIG. 3 is a fragmentary sectional view through a portion of the cord reel assembly of FIG. 1, taken along section line 3—3 thereof.

The cord reel assembly illustrated in the drawings and generally indicated by reference numeral 1 has a generally cylindrically shaped stationary frame or casing assembly 3. As best shown in FIG. 2, the casing assembly includes a casing part 3a having a generally circular end wall 5 constituting a main support wall or base for a rotatable reel body 7 mount within the casing. The casing end wall 5 has a recessed central portion 5a which contains the head 8a of a screw 8 extending through the end wall 5 and threading into a hub member 9 which is anchored by the screw to the end wall 5. The hub 9 forms a rotatable bearing support for the reel body 7.

The casing part 3a has a peripheral cylindrical side wall 11 extending from the margins of the end wall, the side wall 11 terminating at approximately one half the axial extent of the casing assembly 3 where it defines an opening into which the rotatable reel body 7 attached to the hub member 9 may be inserted into the casing part 3a. The casing assembly has another casing part 3b which closes off the open end of the casing part 3 a. The casing part 3b has an annular end wall 13 with a very large central circular opening 15. The casing part 3b has a cylindrical side wall 17 extending transversely from the end wall 13 and positioned in abutment with the end edge of the side wall 11 of the other casing part 3a. As illustrated, the casing parts 3a and 3b are clamped together by clamping members 19. Each clamping member 19 has a generally L-shaped cross section with a short leg 19a engaging the end wall 13 of the casing part 3b and a relatively long leg 19b extending along the abutting side walls 11 and 17 of the casing parts 3a and 3b. A screw 21 passes through an opening 23 in the leg 19b of the associated clamping member 19 and threads into an opening 25 in the side wall 11 of the casing part 3a.

The axial extent of the casing assembly 3 is made as small as possible so that a cord reel assembly of minimum size results. As illustrated, the axial extent of the cord reel assembly 1 is exceedingly small considering the complexity thereof. This high degree of compactness is made possible in part because of the construction of the reel body now to be described and in part due to the relationship of the reel body to the annular end wall 13 of the casing part 3b.

As illustrated, the reel body 7 comprises a main reel body member 7a, which may be made of a molded synthetic plastic material, having a circular end wall portion 27 with an opening 29 in the center thereof which receives the neck portion 9a of the hub member 9. The neck portion 9a of the hub member 9 provides a shoulder 31 which bears against the inner face 27a of the reel body end wall 27. The hub member 9 forms a stationary bearing support for the reel body 7. An annular wall 33, forming an integral transverse extension of the end wall 27, has an outer surface 33a forming a hub for a main cord storage compartment generally indicated by reference numeral 35, and an inner surface 33b forming the outer margin of a spiral leaf spring-containing compartment generally indicated by reference numeral 37. A spiral leaf spring 39 is located within the compartment 37 and has one end anchored within a slot in the annular wall 33 of the main reel body member 7a and an inner end which is anchored within a slot in the hub member 9. As the reel body rotates in the direction caused by the unwinding of the cord from the cord reel assembly in the manner to be described, the spiral leaf spring 39 will tighten. The leaf spring-receiving compartment 37 is closed by a wall member 41 which extends over the outer edge 43 of the annular wall 33 and rotatably engages the defining walls of a slot 45 in the hub member 9.

The reel body includes another member 7b comprising a circular end portion wall 47 which is as of the same diameter as the circular end wall portion 27 of the main reel body member 7a to define therewith the opposite side margins of the main cord storage compartment 35 which has a radial and axial extent each equal to a number of thicknesses of the cord to be wound on the cord reel assembly. The reel body member 7b has a central hub portion 49 with a small central circular opening 51 which fits around the neck portion 9b at the end of the hub member 9. Extending from the inner side of the reel body member 7b is an axially extending annular wall 53 which confronts the other end annular wall 33 of the main reel body member 7a engaged by the wall 41 closing off the leaf spring-receiving compartment 37. The closure wall 41 is held between the annular walls 33 and 53 of the reel body members 7a and 7b by screws 55 having heads bearing against the outer surfaces of counterbored openings (FIG. 2) in the end wall portion 47 of the reel body member 7b and threaded shanks passing through openings 57 in the annular wall 53 of the reel body member 7b and threading into corresponding openings 58 extending axially through the annular wall 33 of the main reel body member 7a. The annular wall 53 of the reel body member 7b has an outer cylindrical surface 53a which is in alignment with the outer cylindrical surface 33a of the annular wall 3 of the reel body member 7a to form part of an overall hub surface around which a power cord 70 is to be wound in the manner to be described.

The hub portion 49 of the reel body member 7b has a slightly curved radially extending passageway 59 having a radially outwardly facing opening at one end thereof located at the corner at the hub portion 49 on the inside of the end wall portion 47 which opening communicates with a space 60 between the end wall portion 47 and closure wall 41. This space 60 communicates with a radially extending opening 63 formed in the annular wall 53 of the reel body member 7b and opening onto the main cord storage compartment 35. The passageway 59 opens at its other end on the opposite side of the hub portion 49 on the outside of the circular end wall portion 47. The reel body 7 is completed by a third circular disc-like member 7c which is secured by four screws 62 upon the hub portion 49 of the reel body member 7b. The disc-like member 7c has a diameter substantially less than the circular end wall portions 27 and 47 of the reel body members 7a and 7b and slightly less than the diameter of the large opening 15 in the annular end wall 13 of the casing part 3b. The disc-like member 7c is positioned in approximately the same plane as the annular casing end wall 13 of the casing part 3b, to effect the maximum compactness of the cord reel assembly 1 and is spaced by the hub portion 49 from the circular end wall portion 47 of the reel body member 7b to define part of a cord take-up compartment 65 extending from a point near the center portion of the reel body (i.e. at the outer surface of the hub portion 49) to the casing side wall 17.

To facilitate the removal of the reel body member 7b and 7c as an integral unit, the reel body member 7c is provided with screw access holes 66 which are in alignment with the heads of the screws 55 so that the screws 55 can be removed and, after removal of the casing part 3b by removal of the clamping members 19, the reel body members 7b and 7c can be removed as a unit to gain access to the remaining parts of the cord reel assembly 1.

A three-conductor electric cord 70 is shown wound within the cord reel assembly 1. The conductor cord 70 is shown as including three conductors 70a, 70b, 70c having metal terminals 72a, 72b, 72c and 72a', 72b', 72c' respectively connected to the opposite ends of the conductors. These conductors are surrounded by a common outer insulation sheathing 71. The conductor cord 70 is wound around the outer hub-forming surfaces 33a and 53a of the aligned annular walls 33 and 53 of the reel body members 7a and 7b to form radially spaced winding layers totaling twelve windings as illustrated. The outer end of the conductor cord 70 passes through a passageway 72 formed by a pair of exitway-forming members 74a and 74b respectively anchored in any suitable way as by screws 73a and 73b to the casing parts 3a and 3b of the casing assembly 3. The passageway 72 faces in a generally axial direction and forms a smooth slippery surface for the sliding movement of the sheathing 71 of the conductor cord 70.

The innermost turn of the windings of the conductor cord 70 in the main cord storage compartment 35 passes through opening 63 into the passageway 60 between the reel body member 7c and the closure wall 41 and then into the passageway 58 formed in the hub portion 49 of the reel body member 7b. The conductor cord 70 then passes out of the passageway 58 and winds around the cylindrical outer surface of the hub portion 49 of the reel body member 7b in the same direction (counterclockwise as viewed in FIG. 4) as the conductor cord is wound in the main cord storage compartment 35. The cord take-up compartment 65 defined between the reel body member 7c and the circular wall portion 47 of the reel body member 7b has a width of approximately only one thickness of the conductor cord 70, so that only one radially extending winding layer can be formed within this compartment. There are approximately half the number of windings of the conductor cord 70 in the cord take-up compartment 65 as there are in the main cord reel storage compartment 35. The portion of the conductor cord 70 passing out of the hub passageway 58 of the reel body member 7b forms the innermost winding of the windings in the cord take-up compartment 65 to effect a maximum compactness of the overall cord reel assembly. The last turn of the conductor cord in the conductor take-up compartment 65 passes out through a cylindrical tube 80 attached to a bracket 82 anchored to the casing part 3b. The cord is knotted at 84 where it leaves the tube 80 so that the knotted portion cannot pass back through the tube.

When the conductor cord 70 is first pulled from the cord reel assembly, the conductor cord 70 unwinds and moves out of the main cord storage compartment 35 and the conductor cord windings in the cord take-up compartment 65 will progressively loosen and balloon outwardly, as shown in FIG. 5. When the number of unwound windings of the conductor cord in the main storage compartment equals the number of windings in the cord take-up compartment 65 (see FIG. 5), any further unwinding of the cord will cause the portion of the cord within the cord take-up compartment 65 to begin winding tightly around the hub 49 of the reel body member 7b in a clockwise direction. FIG. 6 shows the position of the cord in the cord take-up compartment when all of the windings of the conductor cord in the main cord storage compartment have been unwound from the cord reel assembly.

As above indicated, as the conductor cord is unwound from the cord reel assembly, the spiral leaf spring 39 progressively tightens so that when the cord is released, the spiral spring will unwind and, in so doing, will rotate the reel body in the direction which winds the unwound portion of the cord back into the main cord storage compartment 35.

All the parts of the reel assembly, except for example, the screws, are preferably made of a suitable molded synthetic plastic material, although they could be made of metal. It is apparent that the present invention provides an exceedingly compact and exonomical cord reel construction. It should be understood that numerous modifications may be made in the most preferred form of the invention described without deviating from the broader aspects of the invention.

I claim:

1. A retractable cord reel assembly comprising: a casing have side and opposite end walls forming an enclosure; a reel body rotatably supported in said casing enclosure for rotation about an axis extending transversely of said casing end walls; spring means for urging said reel body toward an initial position, the spring means tensing as the reel body rotates from said initial position; said reel body including contiguous axially spaced concentric outer and inner hub portions positioned respectively relatively far from and relatively close to said axis of rotation of the reel body, first and second axially spaced wall means extending radially from said outer hub portion to form therebetween a main cord storage compartment having an axial and radial extent each equal to a number of cord thicknesses, and third wall means extending radially from said inner hub portion but axially spaced from one of said first and second wall means to define therebetween a cord take-up compartment having an axial extent of about one cord thickness, said third wall means fitting into an opening in one of said casing end walls so as to be in substantially planar alignment therewith; and a cord with the major portion of its length wound around said outer hub portion of the reel body so that the winding thereof from the reel body will tense said spring means, the inner end of the cord in said main cord storage compartment extending first to said second hub portion of said cord take-up compartment and winding in said cord take-up compartment in the same direction as the cord is wound in said main cord storage compartment, the number of windings of the cord in said cord take-up compartment being only a fraction of the number of windings in said main cord storage compartment.

2. The retractable cord reel assembly of claim 1 wherein said reel body is an assembly of a first reel body member having a radially extending end wall portion forming said first wall means and an annular wall extending axially from one side of said end wall portion to define part of said outer hub portion of the reel body, the radially inwardly facing side of said annular wall forming the outer margins of a spiral leaf spring-receiving compartment, a second reel body member having a radially extending end wall portion forming said second wall means, said second reel body member having an annular wall extending axially inwardly from the side thereof facing said first reel body member and forming another part of said outer hub portion of the reel body and having an outer surface in alignment with the outer surface of said latter annular wall to complete the outer hub portion said second reel body member having a hub portion on the outer side thereof forming said inner hub portion of the reel body which hub portion has a generally radially extending open-ended passageway extending therethrough which communicates at one end thereof through an opening in the annular wall of said second reel body member with said main cord storage compartment, the other end of said radial passageway opening onto said cord take-up compartment and means securing together said first and second reel body members to form an integral rotatable assembly; said spring means being a spiral coil spring in said coil-spring receiving compartment of the reel body assembly which coil spring is anchored at one end to said reel body assembly and at the other end to a stationary portion of said frame.

3. The cord reel assembly of claim 2 wherein there is provided an end wall member sandwiched between said annular walls of said first and second reel body members to form a closure at the end of the leaf spring-receiving compartment adjacent said second reel body member.

4. The cord reel assembly of claim 2 wherein said second reel body member has attached thereto an outer end wall member forming said third wall means.

5. The cord reel assembly of claim 4 wherein said frame forms a casing for the cord reel assembly which casing has opposite end walls between which transversely extends the axis of rotation of said reel body assembly, said end wall of the casing nearest said end wall member forming the outermost side margin of said cord take-up compartment being an annular end wall having an opening therein within which fits said end wall member of the reel body assembly.

6. The cord reel assembly of claim 5 wherein said casing comprises two axially spaced casing parts, one of said casing parts has a hub projecting therefrom around which said reel body assembly is rotatably mounted, and the other casing part being removably attached to said former casing part and exposing the reel body assembly when disengaged therefrom.

7. The cord reel assembly of claim 2 wherein said frame has a stationary central hub around which portions of said first and second reel body members are rotatably supported.

* * * * *